J. SHEPARD.
Meat and Vegetable Cutter.
No. 54,223. Patented April 24, 1866.
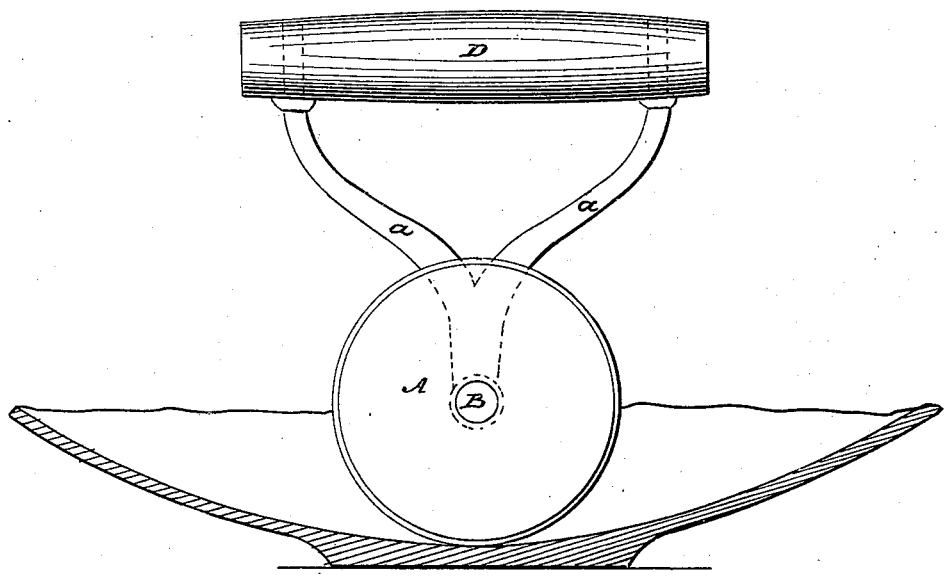
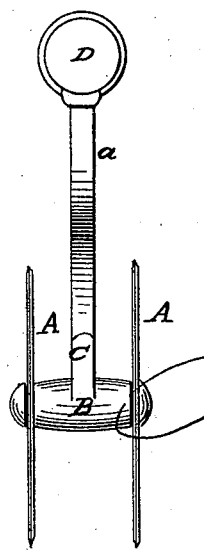
WITNESSES
INVENTOR

UNITED STATES PATENT OFFICE.

JAMES SHEPARD, OF BRISTOL, CONNECTICUT.

MEAT AND VEGETABLE CUTTER.

Specification forming part of Letters Patent No. 54,223, dated April 24, 1866.

*To all whom it may concern:*

Be it known that I, JAMES SHEPARD, of Bristol, in the county of Hartford and State of Connecticut, have invented a new and Improved Meat and Vegetable Chopper, which I term a "Revolving Mincing-Knife;" and I do hereby declare that the following is a full, clear, and exact description thereof, which will enable others skilled in the art to make and use the same, reference being had to the accompanying drawings, forming part of this specification, in which—

Figure 1 is a side elevation of my invention. Fig. 2 is a front elevation of the same.

Similar letters of reference indicate like parts.

My invention consists in the employment or use of one, two, or more circular knives or cutters mounted on a suitable shaft, to which is secured a shank or arm provided with a handle for operating the cutters.

A A designate the circular knives or cutters, and these are fitted to revolve on a shaft, B, on whose ends they are inserted and secured in place in any proper manner. To the shaft B there is attached a shank, C, provided with arms $a\ a$, to which is attached the handle D in any suitable manner.

In using this knife for cutting up or mincing soft articles, such as vegetables, it will be merely necessary to roll the knives or cutters to and fro over the substance being cut, meanwhile bearing down on the handle.

To cut hard substances, an up-and-down drawing stroke would be desirable. For instance, by striking the cutters on the rounding sides of the bowl the cutters will roll down and mince the meat that lies in their path. The cutters cannot clog, for if any large pieces of the meat or other article being cut clings to the cutters it will be thrown off so soon as the cutters bring it up against the shank of the device.

By my invention I produce an instrument for chopping meat and vegetables which will perform double the work of the ordinary hand-chopper, and which will not need half the labor to operate it.

What I claim as new, and desire to secure by Letters Patent, is—

1. The circular knives or cutters A A, mounted on a shaft, B, and operating substantially as specified, or any number of cutters operating in the same manner.

2. The combination and arrangement of the knives or cutters A, shaft B, shank C, with its arms $a.a$, and handle D, as herein specified.

JAMES SHEPARD.

Witnesses:
WM. G. CURTISS,
M. W. OSBORN.